United States Patent
Luschei et al.

(10) Patent No.: US 7,415,766 B2
(45) Date of Patent: Aug. 26, 2008

(54) METHOD AND APPARATUS FOR PROCESSING/MACHINING A VEHICLE WHEEL/RIM PREFORM

(75) Inventors: Shawn Luschei, Woodstock, IL (US); Spencer Hastert, St. Charles, IL (US); Tim Winard, Addison, IL (US); Peter Wang, Streamwood, IL (US)

(73) Assignee: NorthTech Workholding, Schaumburg, IL (US)

( * ) Notice: Subject to any disclaimer, the term of this patent is extended or adjusted under 35 U.S.C. 154(b) by 535 days.

(21) Appl. No.: 10/932,382

(22) Filed: Sep. 2, 2004

(65) Prior Publication Data

US 2006/0042091 A1  Mar. 2, 2006

(51) Int. Cl.
  B21D 53/26 (2006.01)
  B23B 5/22 (2006.01)
  B23B 23/04 (2006.01)
  B23B 3/00 (2006.01)

(52) U.S. Cl. .................. 29/894.3; 29/894; 29/894.323; 29/894.35; 279/2.13; 279/133; 279/137; 279/156; 82/1.11; 82/151

(58) Field of Classification Search ............... 29/894.3, 29/894.323, 894.325, 894, 894.35, 894.354, 29/894.362, 557; 279/2.13, 2.14, 2.24, 106, 279/121, 123, 127, 133, 137, 156; 82/1.11, 82/112, 151; 407/48–50, 91–98, 105–112
See application file for complete search history.

(56) References Cited

U.S. PATENT DOCUMENTS 5,464,233 A * 11/1995 Hanai .......................... 279/137
5,562,007 A * 10/1996 Seymour ..................... 82/1.11
5,820,137 A * 10/1998 Patterson .................... 279/141
6,502,834 B1 * 1/2003 Fukui et al. ................. 279/2.04
6,575,476 B2 * 6/2003 McFadden ................... 279/16
6,862,785 B2 * 3/2005 Baumgartner ............... 29/26 A
6,953,198 B2 * 10/2005 Onyszkiewicz et al. ..... 279/141
7,204,493 B1 * 4/2007 Gatton ........................ 279/106

* cited by examiner

Primary Examiner—David P. Bryant
Assistant Examiner—Alexander P Taousakis
(74) Attorney, Agent, or Firm—Wood, Phillips, Katz, Clark & Mortimer

(57) ABSTRACT

A method of processing a vehicle wheel/rim preform with a centersection/spider and an annular wall extending around a first rotational axis and having an annular surface defining axially spaced, annular inboard and outboard bead seats. The method includes the steps of: providing a workpiece support having a chuck assembly that is rotatable around a second axis and at least one rim wall support assembly; engaging the chuck assembly with the centersection/spider to maintain the vehicle wheel/rim preform in a processing position; engaging the at least one rim wall support assembly with the annular wall to exert thereon a force with a radial component to thereby stabilize the wheel/rim preform; and processing the vehicle wheel/rim preform at the annular surface fully axially between the inboard and outboard bead seats.

21 Claims, 16 Drawing Sheets

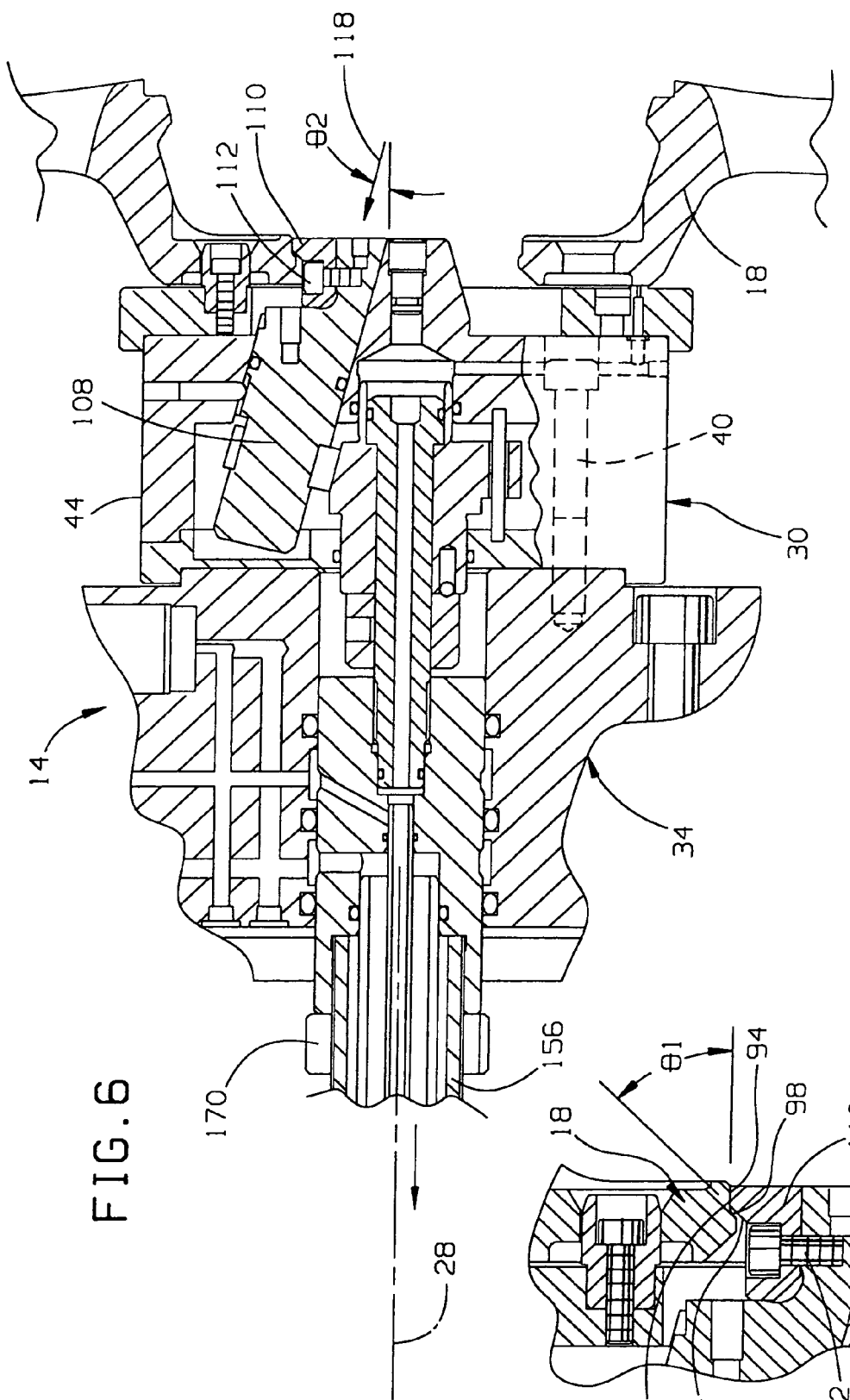

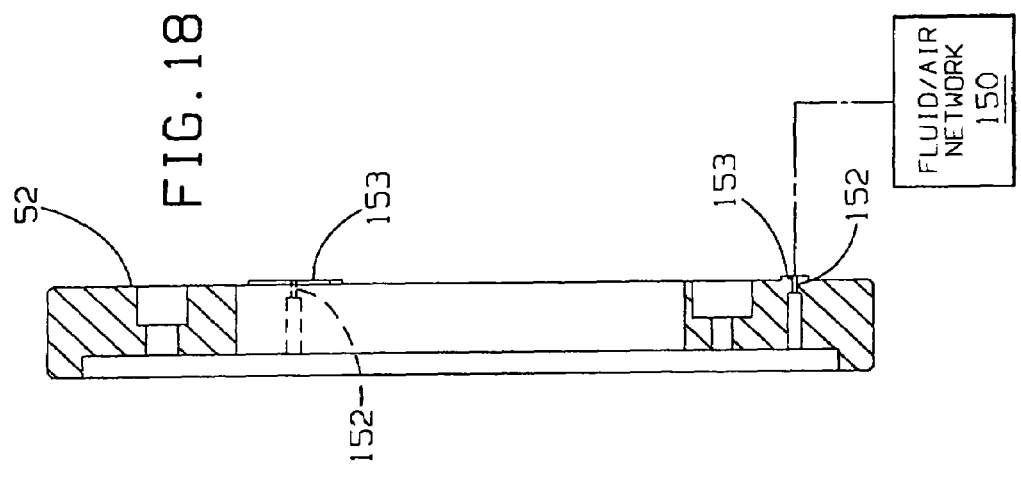
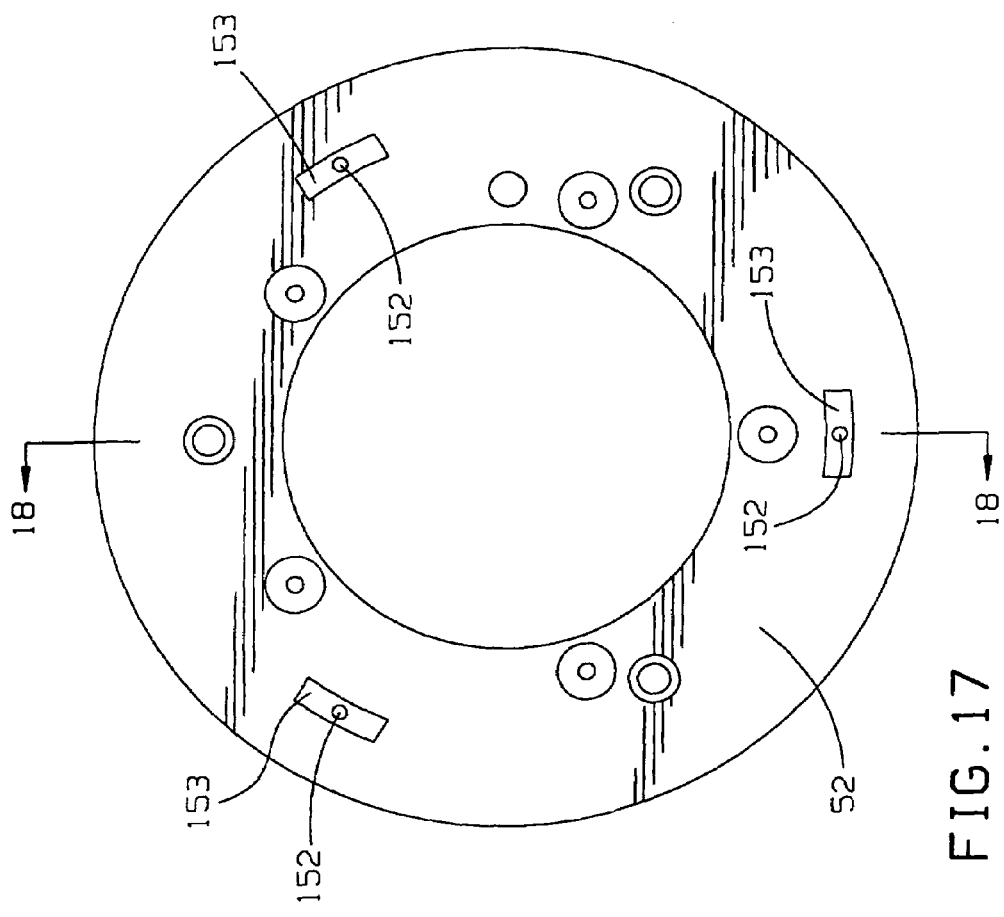

METHOD AND APPARATUS FOR PROCESSING/MACHINING A VEHICLE WHEEL/RIM PREFORM

BACKGROUND OF THE INVENTION

1. Field of the Invention

This invention relates to vehicle wheels/rims of the type to which a separable tire is mounted and, more particularly, to a method of processing a vehicle wheel/rim preform to form surfaces thereon to seat inboard and outboard beads on a tire. The invention is further direction to an apparatus for practicing the method.

2. Background Art

Myriad wheel/rim constructions have evolved over the decades to accept inflatable tires on all types of vehicles, from recreational to commercial applications. The basic wheel/rim construction consists of a centersection/spider, through which the wheel/rim is mounted to a vehicle, and an annular wall, which cooperates with the tire. The annular wall has inboard and outboard flanges, spaced axially with respect to the rotational axis for the wheel/rim, which respectively seat inboard and outboard beads on a tire.

Heretofore, the annular wall has been manufactured either with one piece or using a multi-part construction. With a multi-part construction, the wheel/rim "halves" are separately machined and mechanically joined to produce a unitary structure. This multi-part construction represents an expedient in terms of the manufacturing process but creates a challenge to the manufacturer in terms of maintaining dimensional, alignment, and balance tolerances. The automotive industry is becoming increasingly demanding that the wheel/rim be precisely machined so that there are no appreciable irregularities or defects that will cause vibrations, particularly at high operating speeds.

Whereas in the past, most wheels/rims in the automotive industry were designed to be used in conjunction with decorative hubcaps, the recent trend has been to expose the centersection/spider. This has prompted vehicle manufacturers to place even stricter demands on wheel/rim manufacturers, not only in terms of dimensions and balance, but also in terms of appearance.

Meeting the industry demands offers a particular challenge to wheel/rim manufacturers with respect to the wheel/rim designs wherein a single piece is utilized to form the annular wall between the inboard and outboard flanges. In a typical manufacturing process, the vehicle wheel/rim preform is cast or otherwise formed. The preform is clamped upon a lathe spindle and rotated to allow machining, including on the seating surface on the annular wall, to end specifications. In carrying out this machining, it is important that the preform be positively maintained upon a spindle chuck so that the annular wall can be precisely formed based on certain datum locations. This requires that the preform be clamped in such a manner that it does not shift or deform and is not prone to having induced harmonic vibrations that may adversely alter the machining process.

To avoid these latter conditions, it is known to clamp the preform to the chuck in the region of one of the flanges at a plurality of angularly spaced locations, as shown in U.S. Pat. No. 5,820,137. To effect the required clamping rigidity, a clamping structure is typically utilized at a wheel/rim flange which blocks machining of the wheel/rim in the vicinity of the flange. Generally, in the past, this has necessitated a two step clamping and machining operation. That is, after clamping one of the inboard and outboard flanges and machining accessible regions on the wheel/rim, the wheel/rim is axially inverted and the other of the inboard and outboard regions is exposed to allow machining of the previously clamped portions.

For this machining operation to be effective, the preform must be precisely axially aligned in the reversed clamping orientation. Even slight misalignments may result in an imbalanced structure and/or a detectable step at the location where the machining processes meet. Due to the increasing sensitivity of the automotive industry to even slight imperfections, this process may be impractical to carry out in an economical manner.

One attempted solution to this problem has been to machine between the inboard and outboard flanges with the wheel/rim maintained in a single clamped position on the spindle chuck, as described in U.S. Pat. No. 6,126,174. In U.S. Pat. No. 6,126,174, the preform is required to be constructed with a flange extension which facilitates clamping and ultimately must be removed in a separate processing step. Consequently, additional material must be added to the preform and an additional manufacturing step is required to remove the extension and finish the flange at which the extension is removed to complete the wheel/rim. Additional steps are thus required to machine the wheel/rim. These additional steps add time to the manufacturing process and thereby potentially adversely affect profitability. Further, the material defining the extension must be appropriately handled and disposed of, representing another inconvenience and expense.

SUMMARY OF THE INVENTION

In one form, the invention is directed to a method of processing a vehicle wheel/rim preform with a first rotational axis and having a centersection/spider and an annular wall extending around the centersection/spider and first rotational axis and having an annular surface defining axially spaced, annular inboard and outboard bead seats. The method includes the steps of: providing a workpiece support having a chuck assembly that is rotatable around a second axis and at least one rim wall support assembly; engaging the chuck assembly with the centersection/spider to maintain the vehicle wheel/rim preform in a processing position on the chuck assembly wherein the first rotational axis on the vehicle wheel/rim preform is substantially coincident with the second axis; engaging the at least one rim wall support assembly with the annular wall to exert a force with a radial component upon the annular wall to thereby stabilize the wheel/rim preform; and processing the vehicle wheel/rim preform at the annular surface fully axially between the inboard and outboard bead seats with the vehicle wheel/rim preform maintained in the processing position and rotated by the chuck assembly around the second axis.

In one form, the vehicle wheel/rim preform has a central axle bore with a surrounding surface and the step of engaging the chuck assembly with the centersection/spider involves engaging at least one jaw on the chuck assembly at the surrounding surface.

In one form, the surrounding surface has a stepped diameter with a smaller diameter pilot bore surface portion, a larger diameter surrogate bore surface portion, and an axially facing transition surface portion between the pilot bore surface portion and surrogate bore surface portion, and the step of engaging at least one jaw at the surrounding surface involves engaging at least one jaw against the pilot bore surface portion and urging the vehicle wheel/rim preform in an axial direction.

In one form, the workpiece support has an axially facing locator surface and the step of engaging at least one jaw at the surrounding surface involves bearing the vehicle wheel/rim preform against the locator surface.

In one form, the centersection/spider has a plurality of lug holes with surrounding edges spaced from and angularly around the first rotational axis. The workpiece support has a plurality of axially projecting clocking/drive pins. The step of engaging the chuck assembly with the centersection/spider involves directing a plurality of the clocking/drive pins, one each into a plurality of the lug holes, so that the clocking/drive pins and surrounding edges cooperate to thereby limit relative angular movement between the chuck assembly and centersection/spider relative to the first and second axes with the vehicle wheel/rim preform in the processing position.

In one form, at least a part of the locator surface resides radially inside the plurality of lug holes and the step of bearing the vehicle wheel/rim preform against the locator surface involves bearing the vehicle wheel/rim preform against the part of the locator surface.

In one form, the annular wall has a radially inwardly facing surface and axially spaced ends and the step of engaging the at least one rim wall support assembly with the annular wall involves engaging the at least one rim wall support assembly with the radially inwardly facing surface adjacent to one of the axially spaced ends.

In one form, the steps of engaging the chuck assembly with the centershaft/spider and the at least one rim wall support assembly with the annular wall involve engaging the chuck assembly with the centershaft/spider and the at least one rim support assembly with the annular wall so that no structure resides radially outside of the vehicle wheel/rim preform between the axially spaced ends of the annular wall so that a processing tool can move unobstructedly to effect processing of the annular surface fully between the axially spaced ends of the annular wall with the vehicle wheel/rim preform in the processing position.

In one form, the vehicle wheel/rim preform has a first datum location. The step of engaging the chuck assembly with the centershaft/spider involves engaging the chuck assembly with the centershaft/spider at the first datum location.

The step of engaging the at least one rim wall support assembly with the annular wall may involve engaging a plurality of rim wall support assemblies with the annular wall at angularly spaced locations around the first and second axes.

The step of engaging a plurality of rim wall support assemblies with the annular wall may involve engaging between 5-10 rim wall support assemblies with the annular wall at angularly spaced locations around the first and second axes.

The method may further include the step of providing a controller and a processing assembly and causing the generation of an operating signal and processing of the operating signal by the controller to cause actuation of the processing assembly as an incident of the vehicle wheel/rim preform being borne against the locator surface.

In one form, the vehicle wheel/rim has an axially facing cap region and the method further includes the step of processing the cap region of the vehicle wheel/rim preform with the vehicle wheel/rim preform maintained in the processing position, whereby the annular surface and cap region can both be processed without changing the vehicle wheel/rim preform from the processing position.

In one form, the step of engaging the at least one rim wall support assembly with the annular wall involves extending a plunger with a free end on the one rim wall support assembly radially outwardly to cause the free end to bear against the annular wall.

The step of engaging the chuck assembly with the centersection/spider may involve causing a plurality of jaws to exert both axial and radial forces upon the centersection/spider such that the radial forces tend to radially center the vehicle wheel/rim preform by aligning the first axis with the second axis.

The method may further include the steps of providing a controller and causing the generation of an operating signal and processing of the operating signal by the controller to cause actuation of the at least one rim wall support assembly as an incident of the vehicle wheel/rim preform being borne against the locator surface.

In one form, the vehicle wheel/rim preform has first and second datum locations and the step of engaging the chuck assembly with the centershaft/spider involves engaging the chuck assembly with the centershaft/spider at the first datum location. The step of bearing the vehicle wheel/rim preform against the locator surface involves bearing the second datum location on the vehicle wheel/rim preform against the locator surface.

The step of engaging the at least one rim wall support assembly with the annular wall may involve extending the plunger on the one rim wall support assembly to against the annular wall with a predetermined force.

The method may further include the step of locking the plunger to maintain the predetermined force.

In one form, the at least one rim wall support assembly engages the annular wall adjacent to one axial end of the vehicle wheel/rim preform. The chuck assembly includes the at least one rim wall support assembly and rotates as a unit around the second axis. The steps of engaging the chuck assembly with the centershaft/spider and engaging the at least one rim wall support assembly with the annular wall involve engaging the chuck assembly with the centershaft/spider and engaging the at least one rim wall support assembly with the annular wall so that no part of the chuck assembly extends radially to beyond the annular surface at or axially adjacent to the one axial end of the vehicle wheel/rim preform.

In one form, the step of engaging the at least one rim wall support assembly with the annular wall involves engaging the at least one rim wall support assembly with the annular wall at a discrete location spaced axially from the one axial end of the vehicle wheel/rim preform.

The invention is further directed to an apparatus for supporting a vehicle wheel/rim preform having a centersection/spider and an annular wall extending around the centersection/spider to facilitate processing thereof. The apparatus has a workpiece support with a chuck assembly that is rotatable around a first axis. The chuck assembly has at least one jaw for engaging the centersection/spider of a vehicle wheel/rim preform to be processed so as to maintain the vehicle wheel/rim preform in a processing position wherein a second rotational axis on a vehicle wheel/rim preform to be processed is substantially coincident with the first axis. The workpiece support further includes at least one rim wall support assembly having an element that exerts a force with a radial component upon the annular wall of a vehicle wheel/rim preform in the processing position to thereby stabilize a wheel/rim preform in the processing position.

The apparatus may be provided in combination with a vehicle wheel/rim preform in the processing position, with the wheel/rim preform having a centersection/spider and an annular wall extending around the centersection/spider. The annular wall has an annular surface defining axially spaced, annular inboard and outboard bead seats.

The apparatus may be further provided in combination with a processing assembly with a machining tool which is capable of processing the vehicle wheel/rim preform at the annular surface fully axially between the inboard and outboard bead seats with the vehicle wheel/rim preform maintained in the processing position and rotated by the chuck assembly around the first axis.

The workpiece support may have an axially facing locator surface. In one form, the centersection/spider bears against the locator surface with the vehicle wheel/rim preform in the processing position.

In one form, the vehicle wheel/rim preform has a central axle bore with a surrounding surface and the one jaw engages the surrounding surface to maintain the vehicle wheel/rim preform in the processing position.

In one form, the surrounding surface has a stepped diameter with a smaller diameter pilot bore surface portion, a larger diameter surrogate bore surface portion, and an axially facing transition surface portion between the pilot surface portion and surrogate bore surface portion. The one jaw engages the pilot surface portion and urges the vehicle wheel/rim preform in an axial direction.

In one form, the chuck assembly has a plurality of jaws that bear against the pilot bore surface portion at spaced locations to thereby exert radial forces on the vehicle wheel/rim preform tending to align the first and second axes.

In one form, the workpiece support has an axially facing locator surface and the plurality of jaws bear the centersection/spider against the locator surface with the vehicle wheel/rim preform in the processing position.

In one form, the centersection/spider has a plurality of lug holes with surrounding edges spaced from and around the second axis. The workpiece support has a plurality of axially projecting clocking/drive pins. The plurality of clocking/drive pins are directed, one each, into the plurality of the lug holes so that the clocking/drive pins and surrounding edges cooperate to limit relative angular movement between the chuck assembly and centersection/spider around the first and second axes with the vehicle wheel/rim preform in the processing position.

In one form, the workpiece support has an axially facing locator surface and the centersection/spider bears against the locator surface with the vehicle wheel/rim preform in the processing position. At least a part of the locator surface against which the vehicle wheel/rim preform abuts and resides radially inside the plurality of lug holes.

In one form, the annular wall has a radially inwardly facing surface and axially spaced ends and the at least one rim wall support assembly engages the radially inwardly facing surface adjacent to one of the axially spaced ends.

In one form, no structure on the workpiece support resides radially outside of the vehicle wheel/rim preform between the axially spaced ends of the annular wall so that a processing tool can move unobstructedly to effect processing of the annular surface fully between the axially spaced ends of the annular wall with the vehicle wheel/rim preform in the processing position.

In one form, the vehicle wheel/rim preform has a first datum location and with the vehicle wheel/rim preform in the processing position, the chuck assembly engages the vehicle wheel/rim preform at the first datum location.

The workpiece support may have a plurality of rim wall support assemblies each having an element to exert a force with a radial component upon a vehicle wheel/rim preform in the processing position.

In one form, the workpiece support has 5-10 rim wall support assemblies at angularly spaced locations around the first and second axes.

The apparatus may be further provided in combination with a controller and a processing assembly. The workpiece support is capable of causing the generation of an operating signal as an incident of the vehicle wheel/rim preform being moved into the processing position. The operating signal is processed by the controller to cause actuation of the processing assembly.

In one form, the at least one rim wall support assembly has a plunger with a free end that is extendable radially outwardly to engage a vehicle wheel/rim preform in the processing position.

The apparatus may be provided in combination with a controller. The workpiece support is capable of causing the generation of an operating signal and processing of the operating signal by the controller to cause actuation of the at least one rim wall support assembly as an incident of the vehicle wheel/rim preform being moved into the processing position.

In one form, the vehicle wheel/rim preform has first and second spaced datum locations and the chuck assembly is engaged with the vehicle wheel/rim at the first and second datum locations and the locator surface is engaged with the vehicle wheel/rim at the second datum location.

The plunger may be operated to generate a predetermined force by the free end against the vehicle wheel/rim preform.

The rim wall support assembly may have a lock assembly to maintain the plunger in a position wherein the predetermined force is generated against the vehicle wheel/rim preform.

In one form, the at least one rim wall support assembly engages the annular wall adjacent to one axial end of the vehicle wheel/rim preform and no part of the workpiece support extends radially to beyond the annular surface at, or axially adjacent to, the one axial end of the vehicle wheel/rim preform.

In one form, the vehicle wheel/rim preform has an axially facing cap region that is exposed to allow the cap region and the annular surface to be processed with the vehicle wheel/rim preform maintained in the processing position.

BRIEF DESCRIPTION OF THE DRAWINGS

FIG. 6 is an enlarged, fragmentary, cross-sectional view of the chuck assembly and vehicle wheel/rim preform with the vehicle wheel/rim preform in the processing position and the jaws on the chuck assembly moved from the loading state into a holding state;

FIG. 7 is an enlarged, fragmentary, cross-sectional view showing the cooperation between one of the jaws on the chuck assembly and the vehicle wheel/rim preform with the vehicle wheel/rim preform in the processing position and the jaw in a holding state;

FIG. 17 is an enlarged, end elevation view of a locator assembly, on the chuck assembly against which the vehicle wheel/rim preform is borne with the vehicle wheel/rim preform in the processing position;

FIG. 18 is an enlarged, cross-sectional view of the locator assembly taken along line 18-18 of FIG. 17;

DETAILED DESCRIPTION OF THE DRAWINGS

Figure 1:
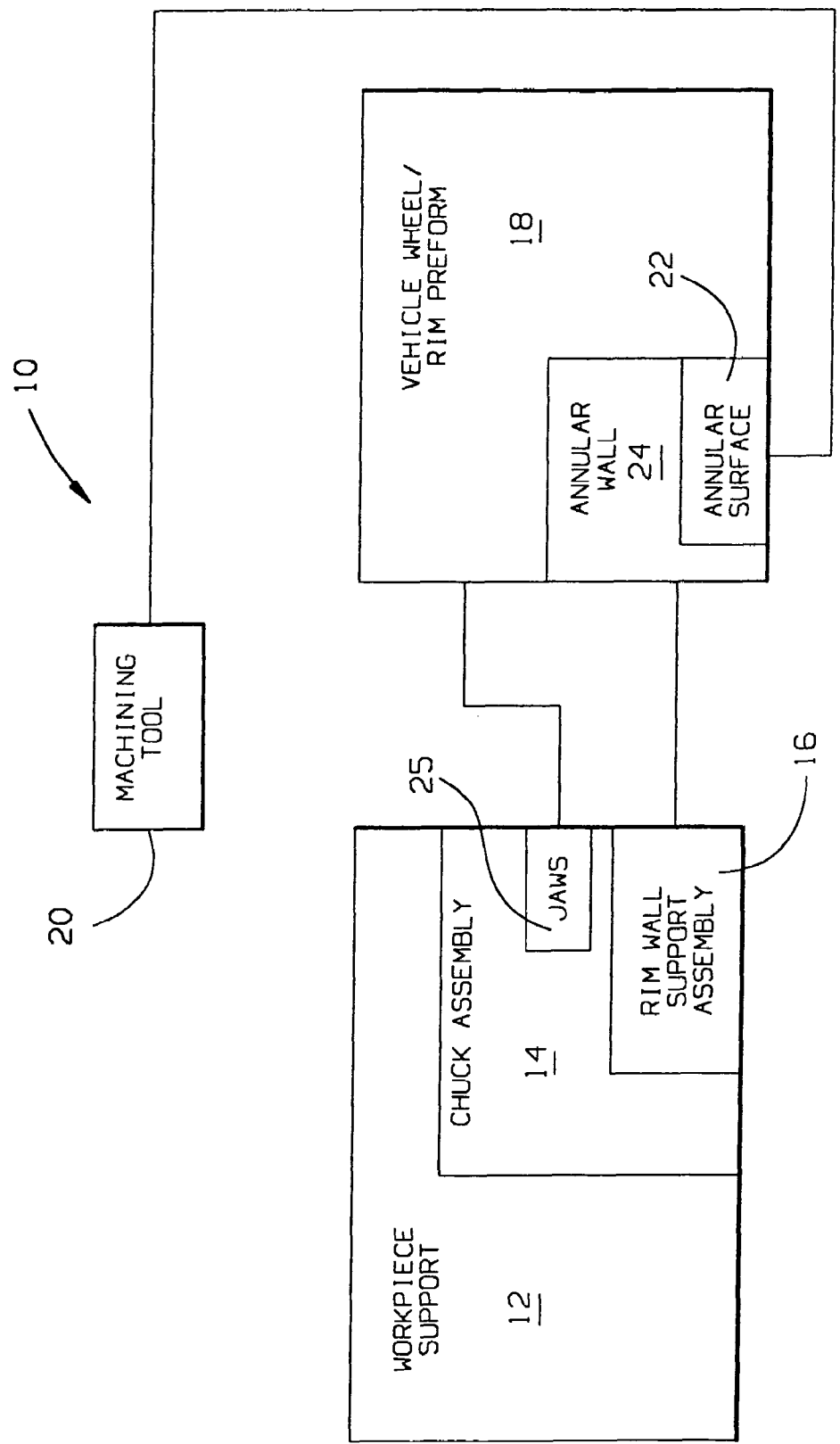
FIG. 1 is a schematic representation of one form of apparatus, according to the present invention, for processing/machining a vehicle wheel/rim preform.

In FIG. 1, a schematic showing of one form of apparatus for processing/machining a vehicle wheel/rim preform, according to the present invention, is shown at 10. The apparatus 10 consists of a workpiece support 12, in turn consisting of a chuck assembly 14 including a rim wall support assembly 16. The workpiece support 12 is designed to mount a vehicle wheel/rim preform 18 in a processing position, wherein a machining tool 20 is allowed to machine/process an annular surface 22 on an annular wall 24 fully between inboard and outboard bead seats (not shown) defined by the annular wall 24. A plurality of jaws 25 clamp the vehicle/rim preform 18 in the processing position therefor. The annular wall 24 is stabilized for the machining operation by the rim wall support assembly 16, which produces a radial force component on the annular wall 24 in relationship to an operating axis around which the chuck assembly 14 rotates, together with the vehicle/wheel preform 18 in the processing position thereon.

Figure 2:
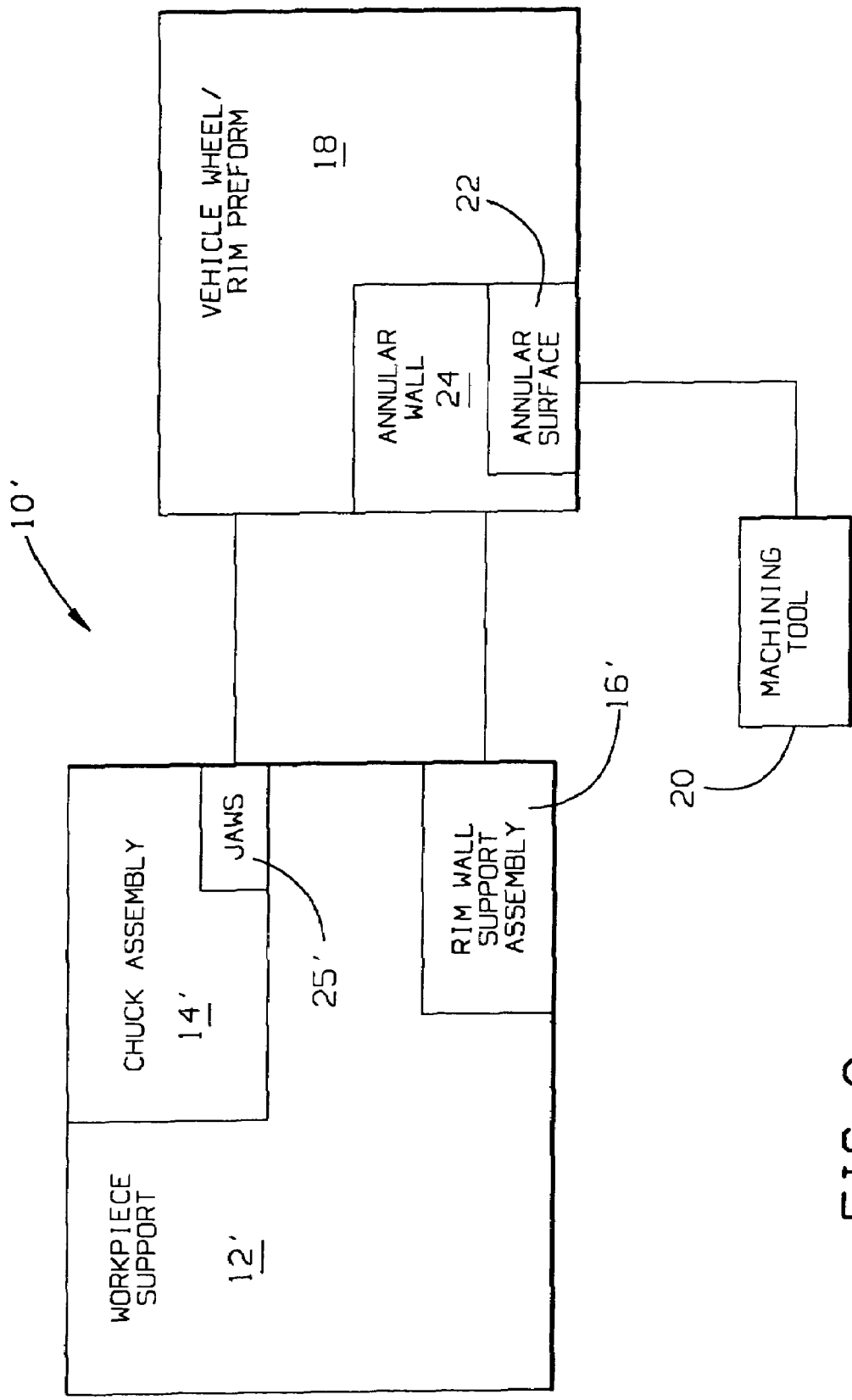
FIG. 2 is a view as in FIG. 1 of a modified form of apparatus for processing/machining a vehicle wheel/rim preform, according to the present invention.

An alternative form of apparatus, according to the present invention, is shown at 10' in FIG. 2. The apparatus 10' is designed to maintain the vehicle wheel/rim preform 18 in a corresponding processing position to facilitate processing/machining by the machining tool 20 on the annular surface 22 on the annular wall 24 of the vehicle/wheel preform 18. The apparatus 10' differs from the apparatus 10 by reason of the workpiece support 12' having a rim wall support assembly 16' that is separate from the chuck assembly 14' which has the clamping jaws 25'.

In both embodiments, one, and more preferably a plurality of, rim wall support assemblies 16,16' are contemplated. The radially generated stabilizing force produced thereby is ideally produced at multiple, discrete, angularly spaced locations around the rotational axes for the chuck assemblies 14,14'. As noted below, preferably 5-10 of the rim wall support assemblies 16,16' are utilized to apply a radial force at discrete locations spaced equidistantly around the operating axis for the chuck assemblies 14,14'. It is conceivable, however, that a single rim wall support assembly could be designed to exert a radial reinforcing force over a substantial circumferential extent over the annular wall 24.

For purposes of simplicity, the inventive structure will be described in detail below with respect to the apparatus 10, with it being understood that the inventive principles apply equally to the apparatus 10, as shown in FIG. 2.

Referring now to FIGS. 3-21, the workpiece support 12 consists of an operating unit 26, to which the chuck assembly 14 is attached. The operating unit 26 causes the chuck assembly 14, with the vehicle/wheel preform 18 in a processing position thereon, to be rotated around an axis 28. The basic operating unit 26 utilizes, for the most part, conventional technology. The invention herein is focused primarily upon the chuck assembly 14 through which the vehicle wheel/rim preform 18 is consistently held in the processing position therefor.

The chuck assembly 14 consists of a clamping portion 30, a locator assembly 32, and a manifold body 34, upon which the rim wall support assemblies 16 are provided. In this embodiment, eight (8) rim wall support assemblies 16 are provided and designated 16(*a*)-16(*h*).

The manifold body 34 has a reduced diameter surface 36 dimensioned to seat closely within a radially undercut surface 38 on the clamping portion 30 to maintain the manifold body 34 and clamping portion 30 centered, each with respect to the other and the axis 28. A plurality of bolts 40 fix the manifold body 34 and clamping portion 30 against relative axial and angular movement.

The locator assembly 32 is radially undercut to define an annular surface at 42 which closely surrounds a radially outwardly facing surface 44 on the clamping portion 30 so as to maintain the locator assembly 32 and clamping portion 30 centered relative to each other and the axis 28. Bolts 46 are directed axially into the locator assembly 32 and into blind bores 48 in the clamping portion 30 to fix the locator assembly 32 and clamping portion 30 against movement both axially and angularly relative to the axis 28. The bolts 46 are directed into stepped bores 50 in the locator assembly 32 so that heads 51 thereon are recessed and do not project axially beyond a flat, annular, axially facing locator surface 52 on the locator assembly 32. A plurality of the bolts 46 are spaced equidistantly around the axis 28.

Clocking/drive pins 54 are secured through bolts 56 to project into lug holes 58 on the vehicle wheel/rim preform 18. These lug holes 58 are conventionally located to accept lug bolts to operatively mount the vehicle wheel/rim preform 18 to a vehicle. Each clocking/drive pin 54 consists of a sleeve 60 with a stepped through bore 62 to accept a bolt 63 so that a head 64 thereon is axially recessed. The sleeve 60 has an outer surface 65 which is closely received by an edge 66 bounding each lug hole 58. With the plurality of clocking/drive pins 54 directed, one each, into the lug holes 58, the vehicle wheel/rim preform 18 is keyed against angular movement relative to the chuck assembly 14 around the axis 28. However, the angular position of the wheel/rim preform 18 is fixed primarily through the jaws 25. The clocking/drive pins 54 facilitate mounting of the vehicle wheel/rim preform 18 and also provide a redundant angular locating function for the wheel/rim preform 18, in the event that any angular shifting of the vehicle wheel/rim preform 18 occurs.

Before the mounting of the vehicle wheel/rim preform 18 is described in detail, a description of the vehicle wheel/rim preform 18 is in order. The vehicle wheel/rim preform 18, as seen most clearly in FIG. 5, may be formed by any suitable means and process known to those skilled in the art. Typically, the vehicle wheel/rim preform 18 is cast from a metal material, such as aluminum, or the like. The vehicle wheel/rim preform 18 consists of a center section/spider 68 defining an axially facing cap region 70, that is either directly exposed, or accepts a hubcap, with the vehicle wheel/rim preform 18 operatively mounted upon a vehicle. The center section/spider 68 projects radially outwardly to an annular wall 72 with axially spaced outboard and inboard flanges 74,76, respectively. The annular wall 72 has a radially outwardly facing, annular surface 78 extending between the flanges 74,76 and defining outboard and inboard bead seats 80,82 for sealingly engaging outboard and inboard beads on a tire (not shown) that is mounted to the vehicle wheel/rim preform 18. The vehicle wheel/rim preform 18, and the annular wall 72 thereon, have a width W (FIG. 5) between axially spaced ends 84,86. The annular wall 72 has a radially inwardly facing surface 88.

The center section/spider 68 has a central axle bore 90 bounded by a surrounding surface 92. The surrounding surface 92 consists of a pilot bore surface portion 94 and a surrogate bore surface portion 96, between which there is a transition surface portion 98. The transition surface portion 98 makes an acute angle θ with respect to the central axis 100 for the vehicle wheel/rim preform 18.

Typically, the vehicle wheel/rim preform 18 is formed in stages towards its final configuration. The present invention is concerned primarily with machining of the annular wall 72 and cap region 70 to their final configuration. Normally, customer specifications and tolerances are based upon reference datum locations. In a normal manufacturing process, the vehicle wheel/rim preform 18 is prepared for final machining of the annular wall surface 78 by providing at least two datum locations. One of the datum locations is a surface 102 which bears against the locator surface 52 with the vehicle wheel/rim preform 18 in the processing position. Another datum location is at the surface 92 surrounding the central axle bore 90, and specifically the pilot bore surface portion 94. The datum locations function as reference points from which the accuracy of all other critical dimensions for the vehicle wheel/rim preform 18 is gauged. Typically, the vehicle wheel/rim preform 18 is machined to its final dimensions at the location at 104 for consistent engagement with the rim wall support assemblies 16.

Figure 4:
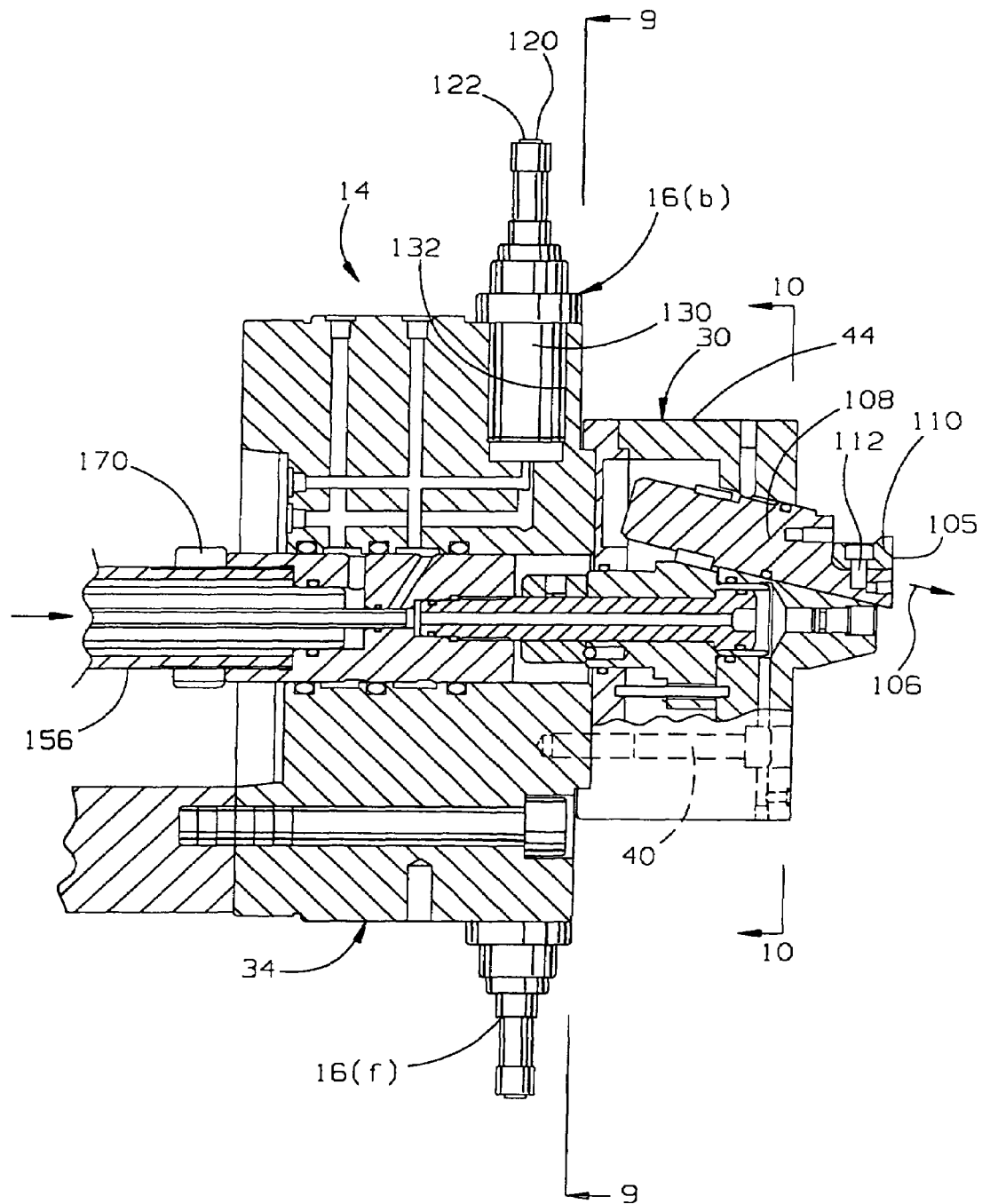
FIG. 4 is an enlarged, fragmentary, cross-sectional view of the chuck assembly in FIG. 3 preparatory to mounting of the vehicle wheel/rim preform, with jaws for holding the vehicle wheel/rim preform in the processing position moved towards a loading state.
Figure 10:
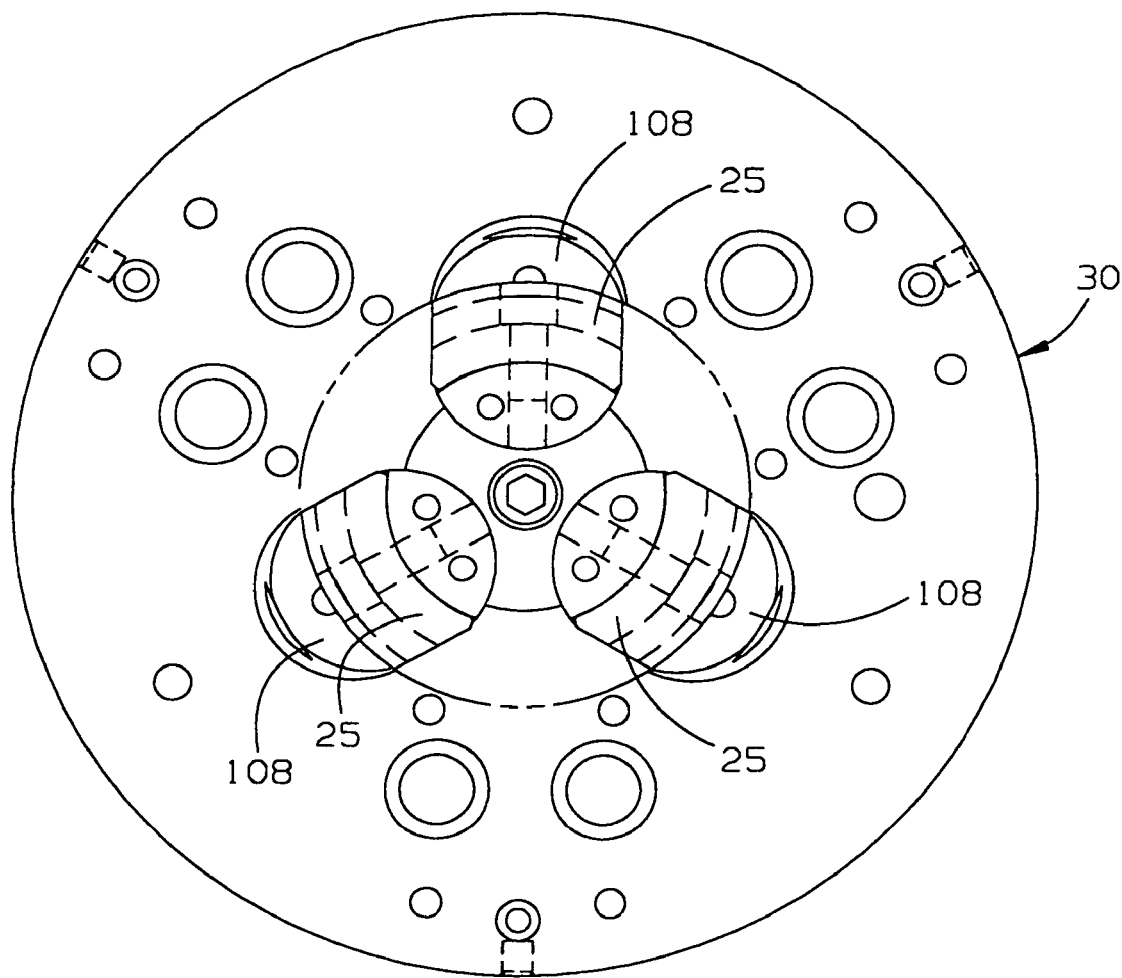
FIG. 10 is an enlarged, end elevation view of the chuck assembly, taken along line 10-10 of FIG. 4, and showing three jaws that clamp the vehicle wheel/rim in the processing position.

To place the vehicle wheel/rim preform 18 in the processing position therefor, the clamping portion 30 of the chuck assembly 14 is placed in a loading state, as shown in FIG. 4. With the chuck assembly 14 in the loading state, the free ends 105 of the clamping jaws 25 shift in the line of the arrow 106 in FIG. 4 to reside collectively within a radius R (FIG. 5) that is less than the diameter of the central axle bore 90, to allow all of the jaws 25 in the loading state to be collectively directed axially therethrough. As seen in FIG. 10, the clamping portion 30 includes three jaws 25. The number of jaws 25 is a matter of design choice. One suitable form of clamping portion 30 is sold commercially by Kitigawa Iron Works, as its Model PVE-06 clamping chuck.

Each jaw 25 consists of an elongate body 108 with a clamp fitting 110 attached thereto, as by a bolt 112. The clamp fitting 110 is designed to be complementary to the surface 92 surrounding the central axle bore 90 on the vehicle wheel/rim preform 18. More specifically, as seen in FIGS. 7 and 13-15, the clamp fitting 110 has an angled surface portion 114 and a clamp surface portion 116, that is contiguous with the angled surface portion 114. The angled surface portion 114 makes an angle θ1 (FIG. 7) with respect to the chuck assembly axis 28, with the clamp surface portion 116 extending substantially parallel to the axis 28. The angle θ1 is nominally matched to the angle θ (FIG. 5) for the transition surface portion 98 on the surface 92 surrounding the central axle bore 90 so that the surfaces 98, 114 do not interfere or abut as the clamp surface portion 116 engages the pilot bore surface portion 94.

With the jaws 25 on the clamping portion 30 in the loading state, the vehicle wheel/rim preform 18 can be placed in the processing position of FIGS. 3, 6-8, 20 and 21, with the surface 102 on the vehicle wheel/rim preform 18 against the locator surface 52 and the clocking/drive pins 54 directed through the lug holes 58. By changing the clamping portion 30 from its loading state into a holding state, the jaws 25 are moved generally in the line of the arrow 118 in FIG. 6, that makes an angle θ2 with respect to the chuck assembly axis 28. As this occurs, clamp surface portions 116 encounter the pilot bore surface portion 94. Continued movement of the jaws 25 causes the clamp surface portions 116 to produce forces on the pilot bore surface portion 94 that have both radial and axial components. This action effects centering and stabilization of the vehicle wheel/rim preform 18. Thus, the jaws 25 cooperatively urge the vehicle wheel/rim preform 18 so that its axis 100 becomes, and remains, coincident with the chuck assembly axis 28, and simultaneously bears the surface 102 on the vehicle wheel/rim preform 18 in an axial direction positively against the locator surface 52 on the chuck assembly 14. Through this arrangement, the vehicle wheel/rim preform 18 becomes centered and fixed based upon the datum locations at the surfaces 92, 102 and fixed against movement relative to the chuck assembly 14 either radially, axially, or angularly with respect to the axis 28.

Figure 11:
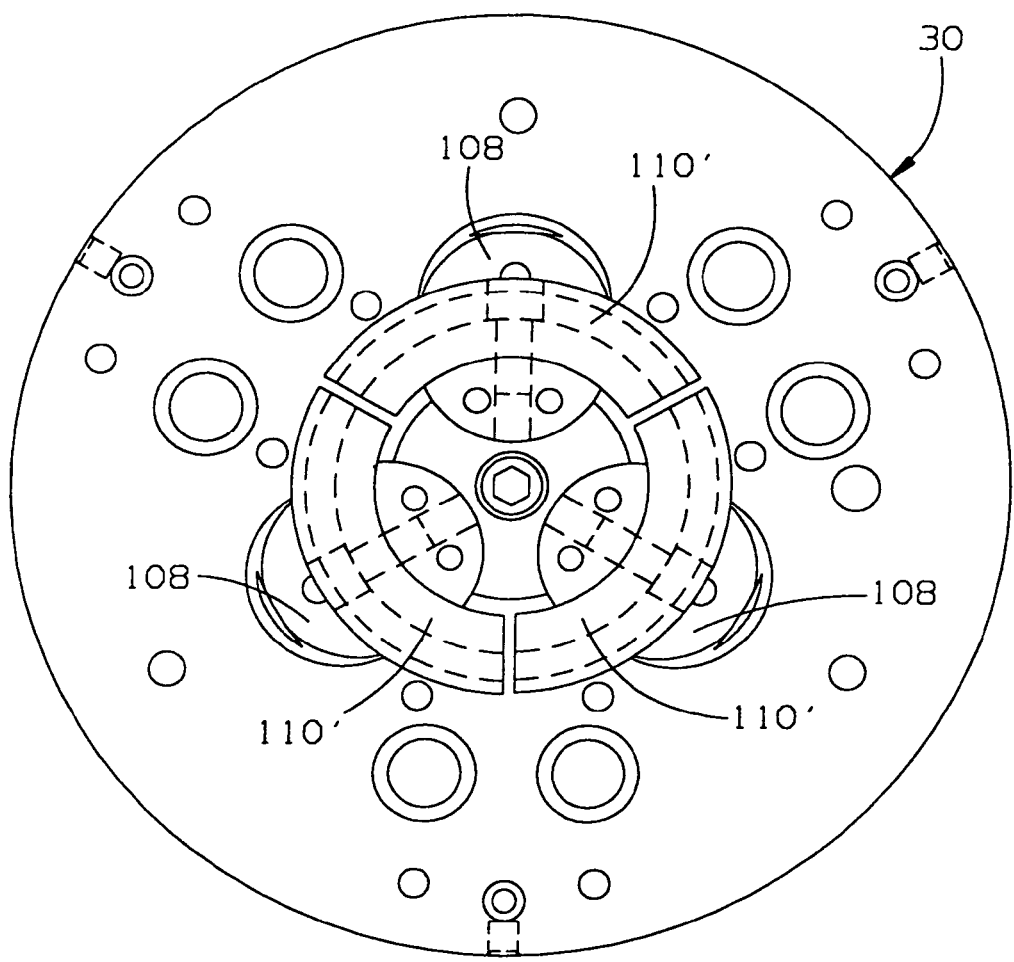
FIG. 11 is a view as in FIG. 10 with a modified form of jaw configuration.
Figure 12:
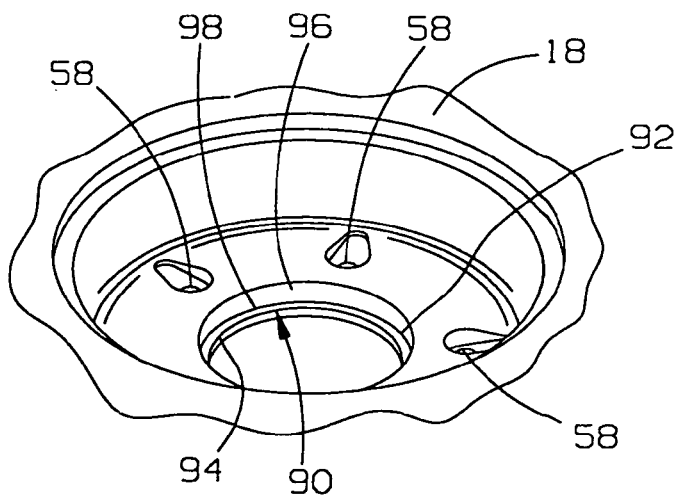
FIG. 12 is an enlarged, fragmentary, perspective view of a portion of the vehicle wheel/rim preform, including a central axle bore with a surrounding surface that is engaged by the jaws with the vehicle wheel/rim in the processing position.
Figure 13:
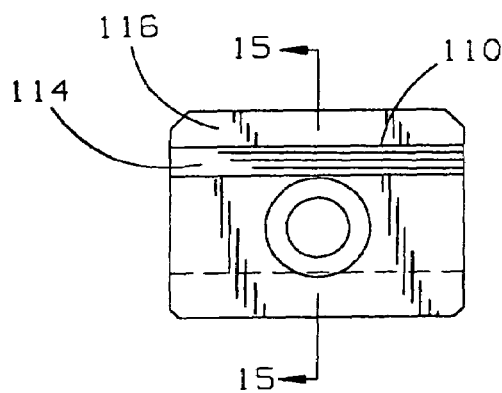
FIG. 13 is an enlarged, radial view of a clamp fitting provided on each of the jaws.
Figure 15:
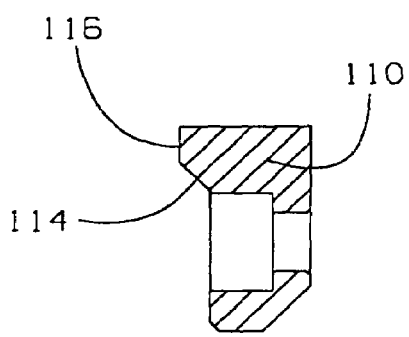
FIG. 15 is an enlarged, cross-sectional view of the clamp fitting taken along line 15-15 of FIG. 13.
Figure 14:
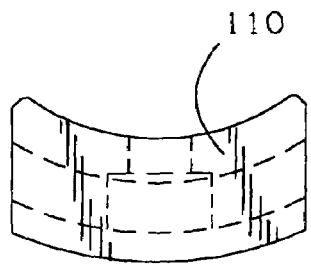
FIG. 14 is an enlarged, end elevation view of the clamp fitting in FIG. 13.
Figure 16:
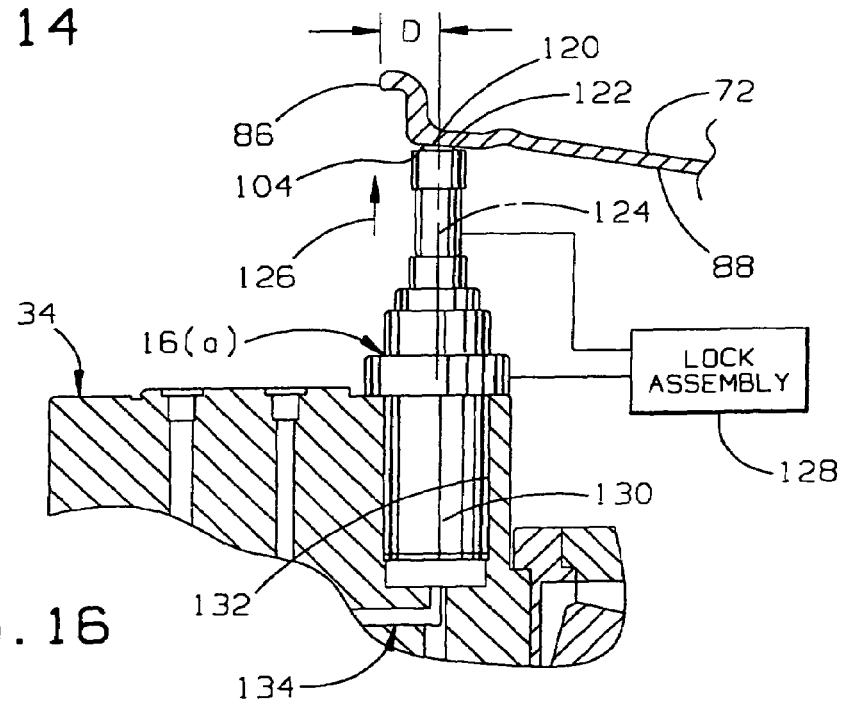
FIG. 16 is an enlarged, fragmentary, cross-sectional view showing the interaction of one of the rim wall support assemblies with the annular wall on the vehicle wheel/rim preform.
Figure 19:
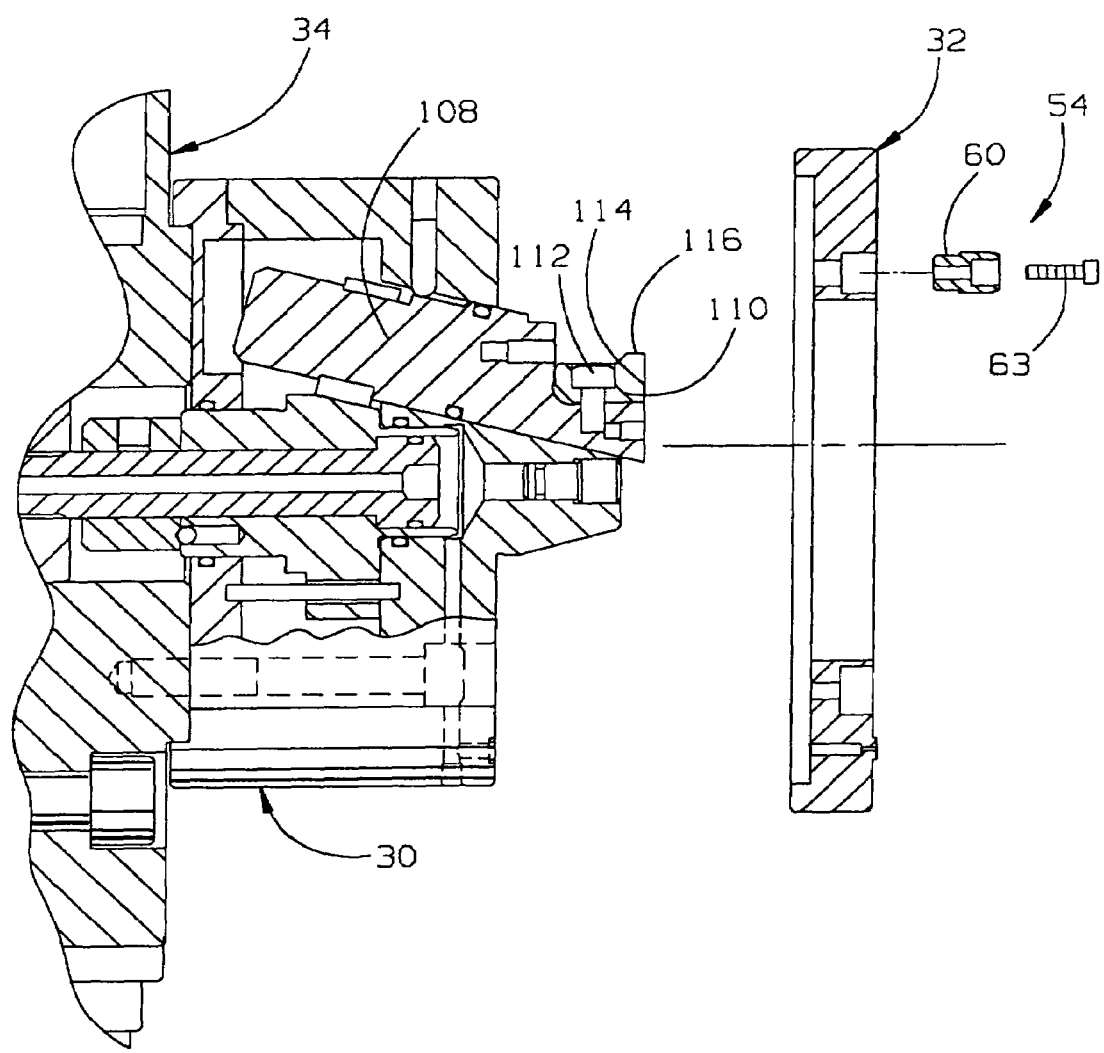
FIG. 19 is an enlarged, cross-sectional view of the chuck assembly with the locator assembly separated therefrom.

To prevent marring of the vehicle wheel/rim preform 18 by the clamp fittings 110, a modified form of clamp fitting 110', as shown in FIG. 11, may be used so that the surfaces thereon, that engage the vehicle wheel/rim preform 18, cooperatively extend through substantially 360° around the surface 92 surrounding the central axle bore 90. This distributes the holding force upon the vehicle wheel/rim preform 18 over a larger area to avoid indentations or marring through contact with the jaws 25. As noted above, the number and precise design of the jaws 25 is not critical to the present invention.

Once the vehicle wheel/rim preform 18 is clamped into the processing position therefor, the rim wall support assemblies 16(a)-16(h) can be operated. In a preferred form, the rim wall support assemblies 16 have the same construction, each with an extendible plunger 120 with a free end 122 that bears upon the radially inwardly facing surface 88 on the annular wall 72. Preferably, the center 124 (FIG. 16) of the plunger 120, and thus the line of force application by the free end 122 to the radially inwardly facing surface 88, is spaced a distance D, on the order of 50 mm, or less, from the end 86 of the annular wall 72.

As noted above, the portion 104 of the radially inwardly facing surface 88 is at a finally machined location so that the annular wall 72 will be consistently stabilized by the rim wall support assembles 16(a)-16(h) preparatory to machining. Each of the extendible plungers 120 is directed radially outwardly in the direction of the arrow 126 in FIG. 16 to produce a predetermined force at discrete locations spaced equidistantly around the perimeter of the surface portion 104. In a typical vehicle wheel/rim preform 18, a suitable force magnitude is on the order of seven (7) pounds or less. As shown schematically in FIG. 16, each of the rim wall support assemblies 16(a)-16(h) is preferably designed to include a lock assembly 128 through which the extendible plunger 120 is effectively fixed, once the desired predetermined force is applied therethrough, to avoid pressure variations during the machining operation.

The precise construction of each of the rim wall support assemblies 16(a)-16(h) is likewise not critical to the present invention. In the embodiment shown, each rim wall support assembly 16 consists of an hydraulically actuated cylinder with a body 130 that is mounted by embedding the same in a complementary receptacle 132 in the manifold body 34. In this embodiment, the rim wall support assemblies 16(a)-16(h) are hydraulically operated through fluid controllably delivered to and from the rim wall support assemblies 16(a)-16(h) via a hydraulic network at 134 through the manifold body 34.

It should be understood that the use of hydraulics is not required. The rim wall support assemblies 16(a)-16(h) might be pneumatically operated. The invention contemplates virtually any type of mechanism for producing the desired force application at the surface portion 104. For example, the rim wall support assemblies 16 might even be manually adjustable, though this is not practical from an efficiency standpoint. It is only critical that a radial supporting force be applied to the surface portion 114 to rigidify the annular wall 72 adjacent to the axial end 86 thereon adequately preparatory to machining. By using 5-10 rim wall support assemblies 16(a)-16(h), the annular wall 72 is positively stabilized against deformation under machining forces or those induced by harmonic vibrations as the vehicle wheel/rim preform 18 is rotated by the chuck assembly 14 during machining operations.

Figure 20:
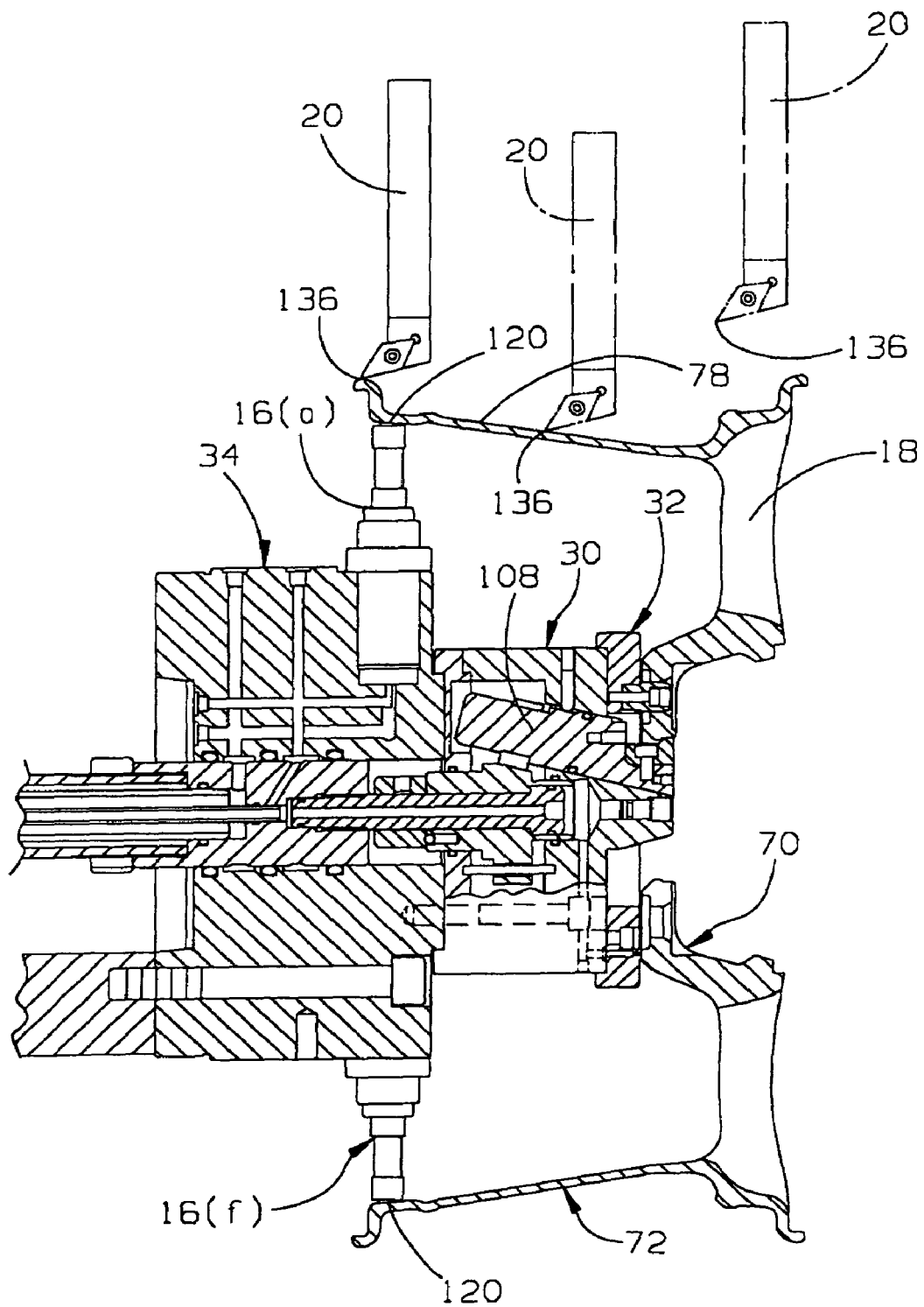
FIG. 20 is an enlarged, cross-sectional view of the chuck assembly with the vehicle wheel/rim preform in a processing position thereon and the annular rim thereon shown being operated upon by a processing tool of a machining tool.
Figure 21:
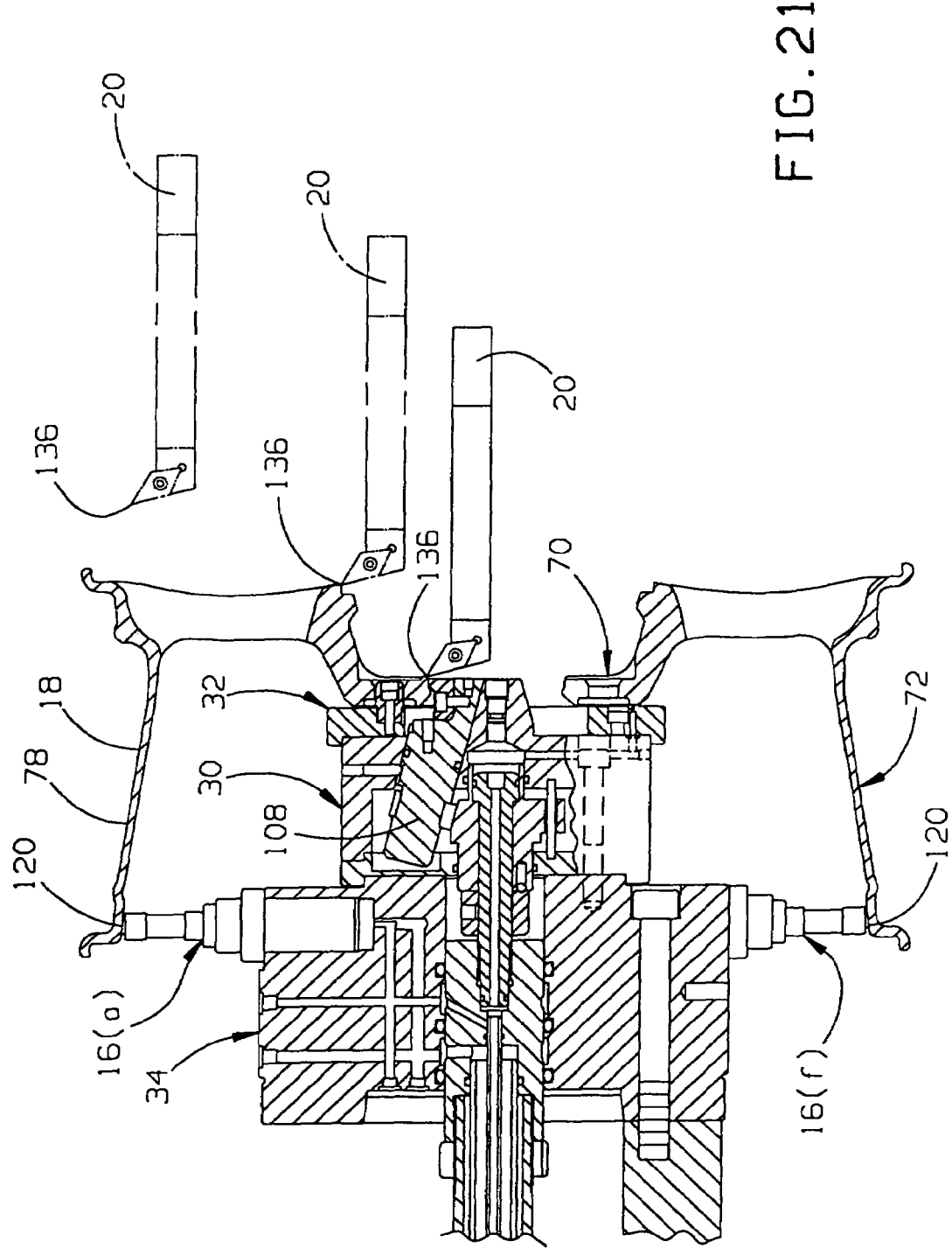
FIG. 21 is a view as in FIG. 20 wherein the processing tool is shown in different positions to operate on a cap portion of the vehicle wheel/rim preform.

Once the rim wall support assemblies 16 have been operated, the vehicle wheel/rim preform 18 is in a state in which processing/machining operations can be carried out using the machining tool 20. As can be seen in FIGS. 3, 8, 20 and 21 preferably, no part of the workpiece support 12 extends radially to beyond the radially outwardly facing annular surface 78 on the annular wall 72 so that a processing tool 136 on the machining tool 20 can move unobstructedly to effect processing of the annular surface 78 fully between the spaced ends 84,86 of the annular wall 72, as seen in FIG. 20. As seen additionally in FIG. 21, with the vehicle wheel/rim preform 18 in the processing position, the processing tool 136 can access the full radial expanse of the cap region 70 to effect machining thereof. Accordingly, with a single clamping step, the vehicle wheel/rim preform 18 can be held in a processing position in a manner that allows the entire surface 78, between the axial ends 84,86 of the wall 72 and cap region 70, to be machined without releasing and reclamping the vehicle wheel/rim preform 18.

Figure 5:
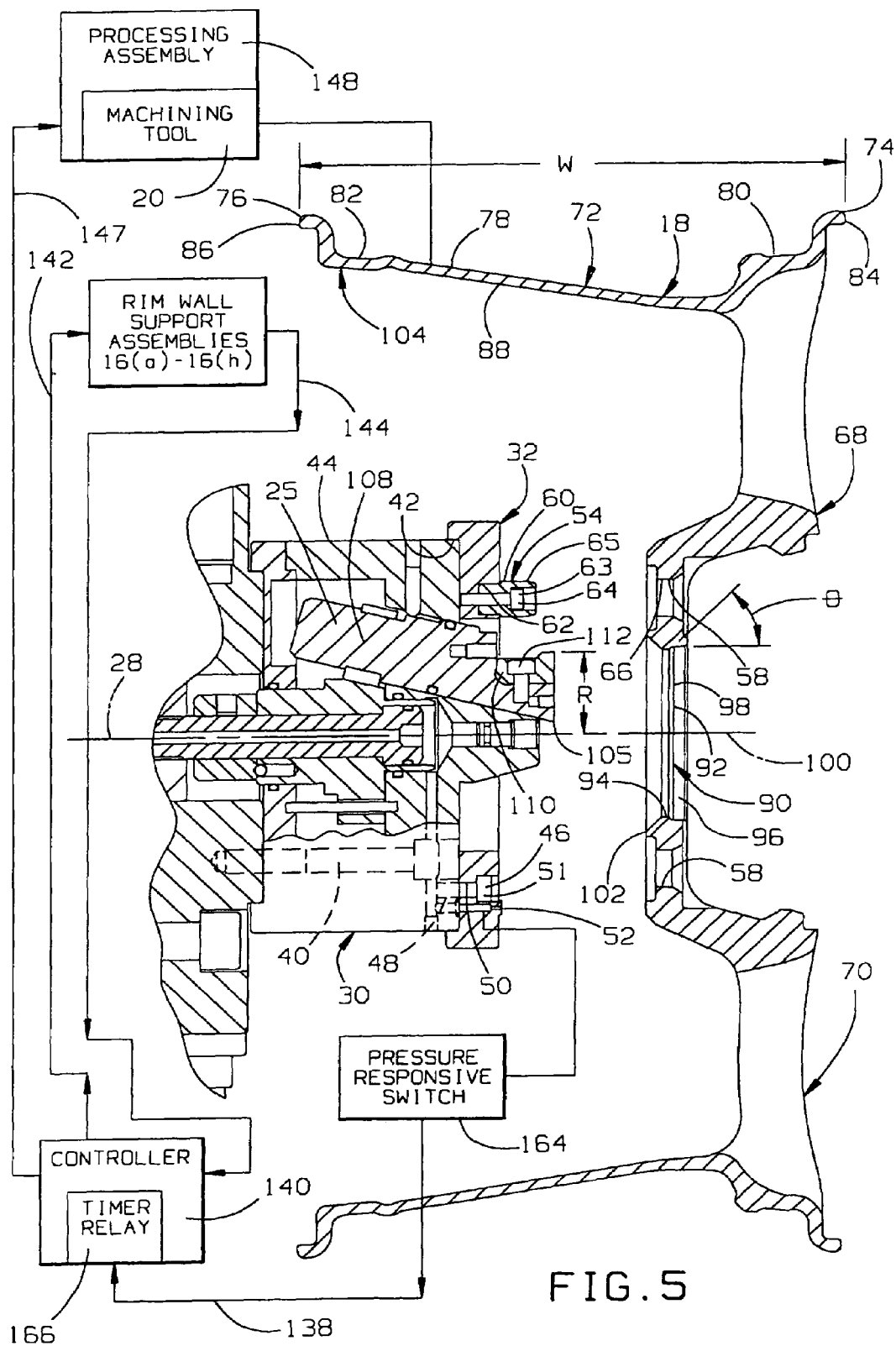
FIG. 5 is an enlarged, fragmentary, cross-sectional view of the chuck assembly in the state shown in FIG. 4 and in relationship to a vehicle wheel/rim preform, which is in a pre-mounting position relative to the chuck assembly, and with other operating components on the apparatus shown in schematic form.
Figure 8:
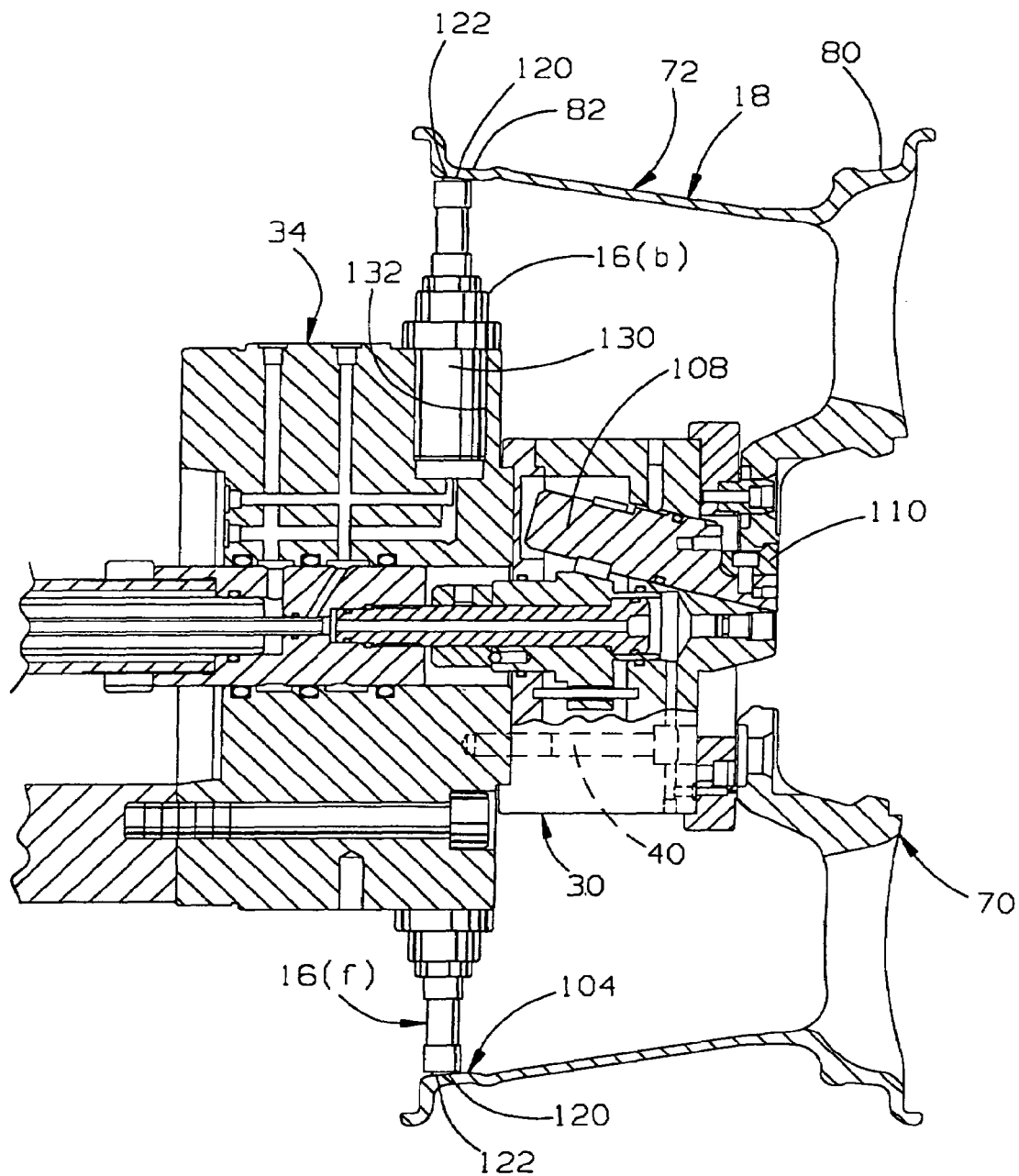
FIG. 8 is an enlarged, fragmentary, cross-sectional view of the chuck assembly with the jaws in a holding state and the rim wall support assemblies actuated to radially reinforce an annular wall on the vehicle wheel/rim preform preparatory to machining the vehicle wheel/rim preform.
Figure 9:
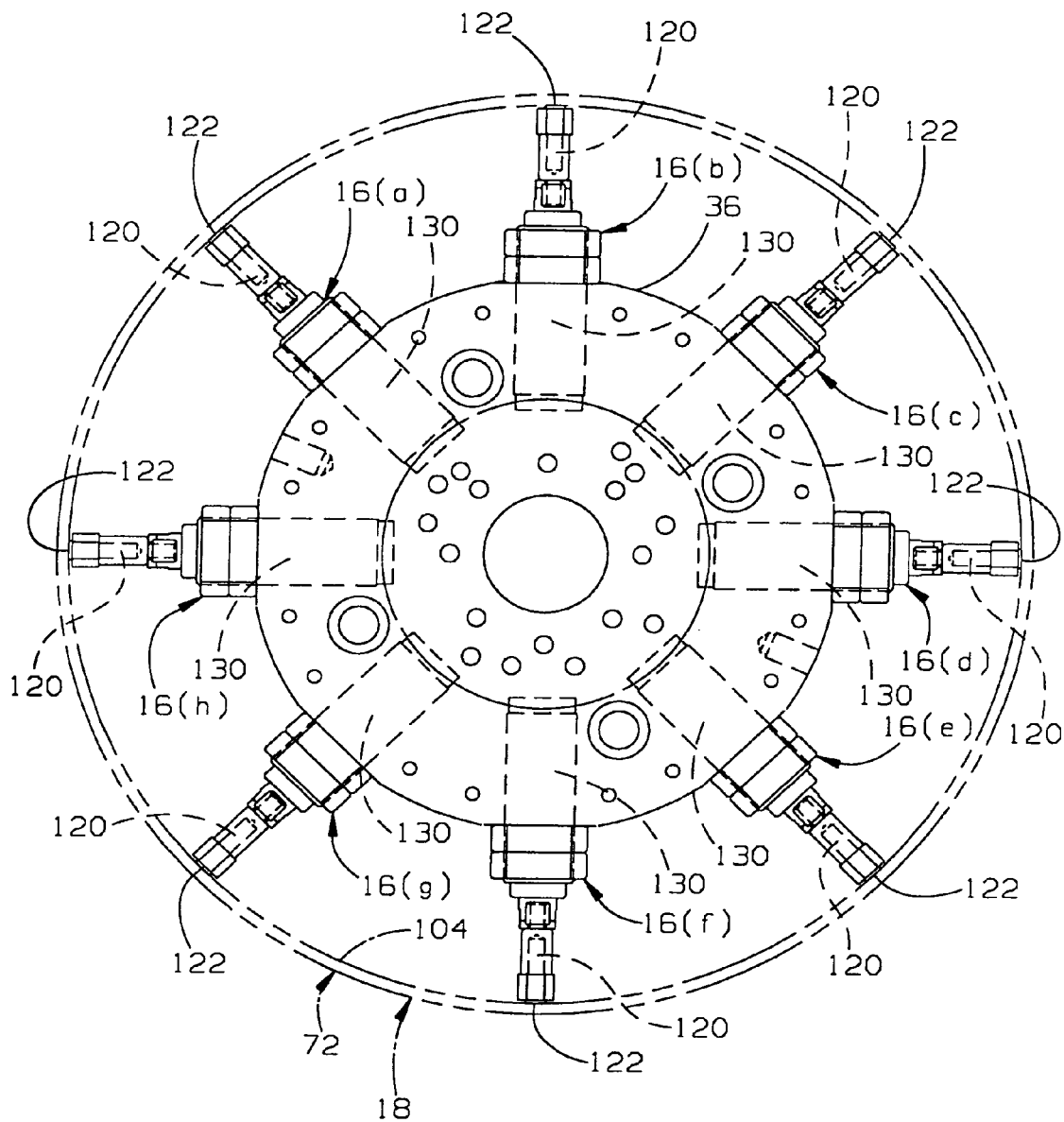
FIG. 9 is an enlarged, end elevation view of the chuck assembly, taken along line 9-9 of FIG. 4, and showing the rim wall support assemblies against the annular wall on the vehicle wheel/rim preform.

As shown in FIG. 5, the invention also contemplates that the apparatus 12 may automatically sequence through operations once a procedure is initiated. As an incident of the surface 102 on the vehicle wheel/rim preform 18 seating on the locator surface 52, a signal 138 is generated to a controller 140 which produces an operating signal 142 to the rim wall support assemblies 16(a)-16(h). Once the predetermined radial force is applied to the annular wall 72 through the rim wall support assemblies 16(a)-16(h), a feedback signal 144 is sensed by the controller 140, which then generates an operating signal 147 to a processing assembly 148, which may include, or consist entirely, of the machining tool 20, which then initiates the processing/machining. The particular processing/machining may be preprogrammed.

In one form, the signal 138 is generated by a redirection of fluid/air flow through a network 150, as shown generically in FIG. 18. With the vehicle wheel/rim preform 18 spaced from the locator surface 52, pressurized fluid/air in the network 150 is expelled through, in this case three (3), one (1) millimeter holes 152 through the locator surface 52. With the vehicle wheel/rim preform 18 clamped in the processing position, the holes 152 become blocked so that the pressurized fluid/air is redirected through the network 150 to produce the signal 138 to the controller 140 that initiates operation of the rim wall support assemblies 16(a)-16(h). In the embodiment depicted, the surface 52 has three (3) axially raised bosses 153 which the surface 102 of the vehicle wheel/rim preform 18 bridges and against which the surface 102 seats. The holes 152 extend through the bosses 153.

Figure 3:
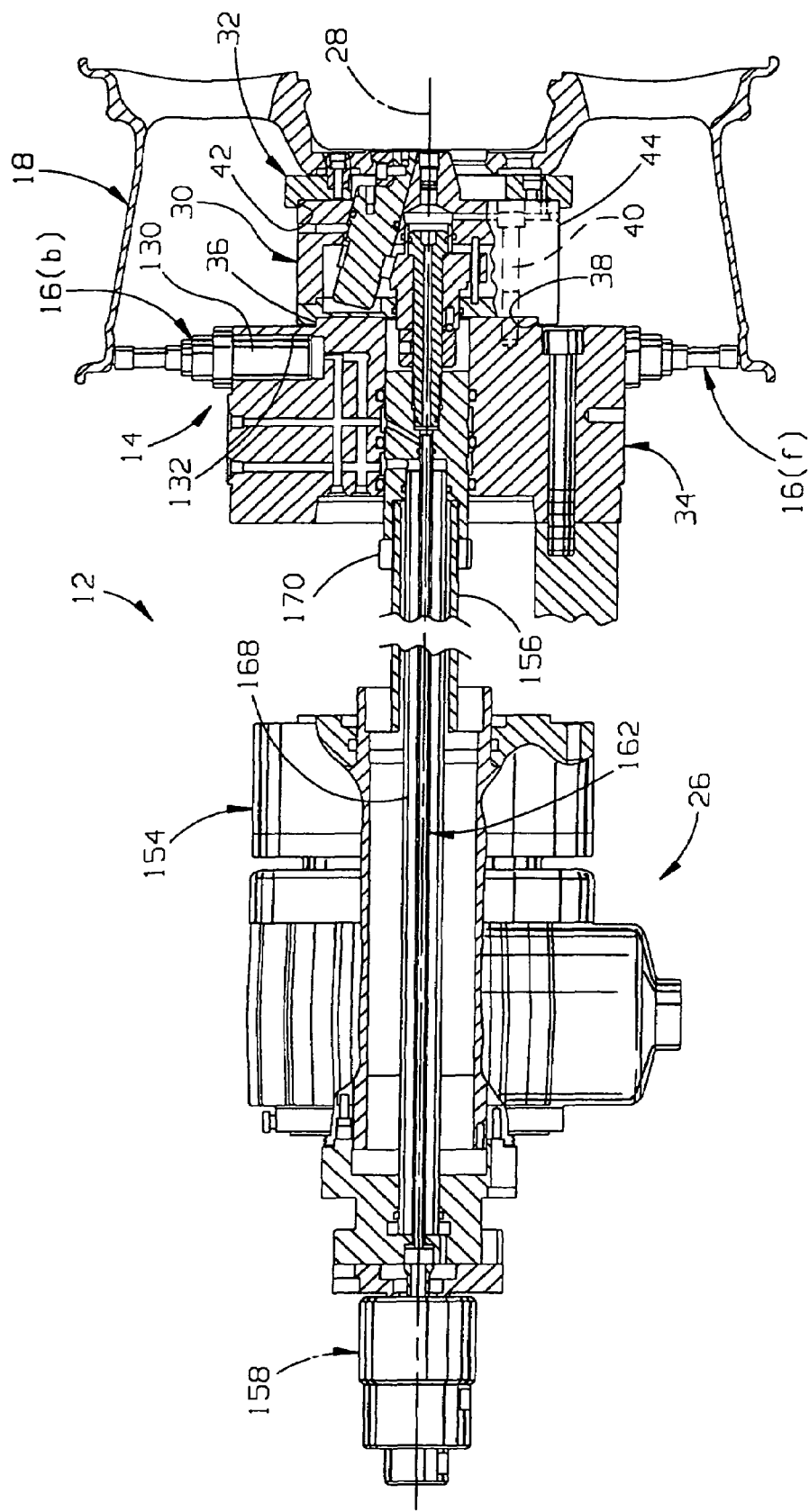
FIG. 3 is a fragmentary, cross-sectional view of a specific form of the apparatus in FIG. 1, and including a chuck assembly and operating unit for the chuck assembly, and with a vehicle wheel/rim preform in a processing position on the chuck assembly.

Referring now, particularly to FIGS. 3-5, additional details of the operating unit 26 will now be described. The operating unit 26 utilizes a single piston, linear actuator 154 which provides a pulling force on the clamping portion 30 through a draw tube 156. Once the actuator 154 draws the vehicle wheel/rim preform 18 into the processing position therefor, the fluid/air in the network 150 is redirected to produce the signal 138 to the controller 140. Fluid/air is supplied from a two-passage rotary union 158 spaced axial from the linear actuator 154. Fluid/air is directed through the linear actuator 154 and the manifold body 34 and into the clamping portion 30 through a fluid/air feed tube 162. The fluid/air exhausts through the holes 152. Once the vehicle wheel/rim preform 18 is in the processing position, the holes 152 are blocked, thereby creating a back pressure that trips a pressure responsive switch 164 that sends the signal 138 electronically to the controller 140. The signal 138 is required to operate the machine safely. At this point, the pilot surface portion 94 and the surface 102 function as manufacturing datum locations.

The controller 140 may have an associated timer relay 166 with a specific delay programmed before delivery of pressurized hydraulic fluid/oil to the rim wall support assemblies 16(a)-16(h) is initiated. The fluid/oil is directed through the rotary union 158 through a fluid/oil feed tube 168, a draw bar connector 170, through which the clamping portion 30 is shifted, and the manifold body 34. As the fluid/oil is directed into the rim wall support assemblies 16(a)-16(h), the plungers 120 are moved radially outwardly to produce the desired radial pressure upon the annular wall 72. As previously noted, the plungers 120 preferably make contact with the annular wall 72 with a force of less than 7 pounds.

Once initial contact is made between the plungers 120 and annular wall 72, the rim wall support assemblies 16 completely fill with oil, to perform the function of the aforementioned lock assembly 120. More specifically, contact pressure is preferably limited to 5 pounds through a spring and a positive internal stop. Once fluid/hydraulic pressure increases to maximum system pressure, the pressure is applied to a collet clamping mechanism that grips the plunger shaft, maintaining its relative position. With the fluid/hydraulic circuit fully energized, each rim wall support assembly 16(*a*)-16(*h*) applies less than seven (7) pounds of force but holds radial position with over five hundred (500) pounds of force. As a result, a positive stabilizing force is afforded without deformation of the annular wall 72. This force generates the required resistance against deformation during machining. At the same time, the rim wall support assemblies 16(*a*)-16(*h*) provide harmonic damping during machining.

Figure 22:
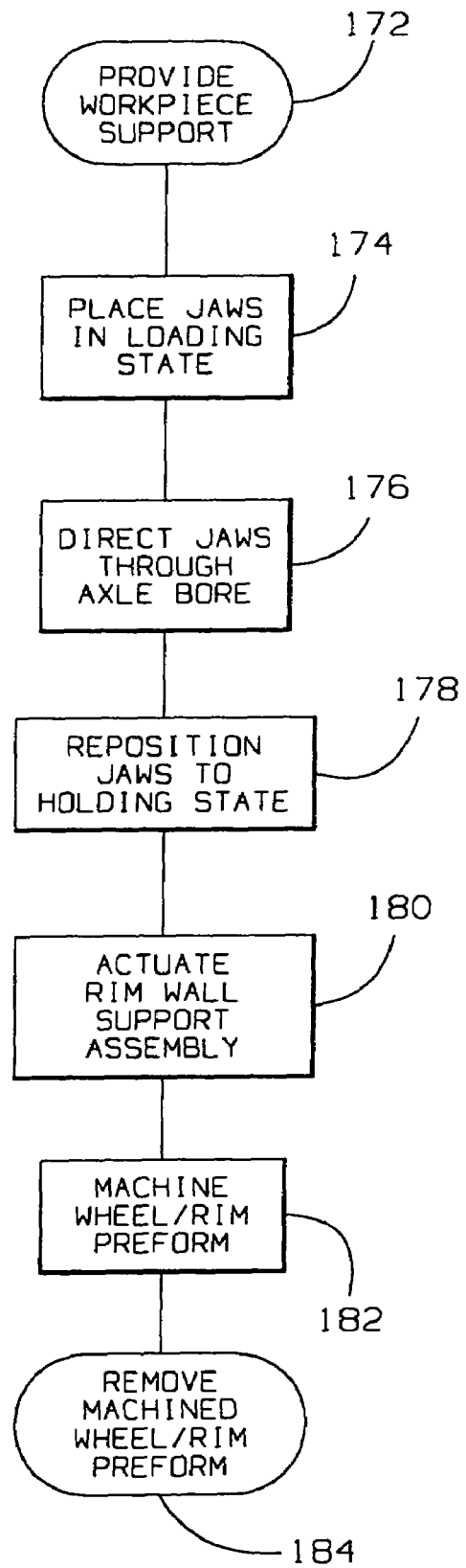
FIG. 22 is a flow diagram representation of a method for processing/machining a vehicle wheel/rim preform, according to the present invention.

A typical procedure for processing a vehicle wheel/rim preform, according to the present invention, will now be described with respect to FIG. 22. As shown at block 172, the workpiece support 12 is provided. The jaws 25 on the clamping portion 30 are placed in a loading state, as shown at block 174. The jaws 25 are then directed through the central axle bore 90, as shown at block 176. With the plungers 120 retracted, the vehicle wheel/rim preform can be loosely rested upon the free ends 122 of the plungers 120 to facilitate mounting of the vehicle wheel/rim preform 18. That is, the weight of the vehicle wheel/rim preform 18 can be borne by the multiple plungers 120 with the vehicle wheel/rim preform 18 in a pre-mounting position, to facilitate direction of the jaws 25 through the central axle bore 90. The jaws 25 are then repositioned to a holding state, as shown at block 178, wherein the vehicle wheel/rim preform 18 is clamped in the processing position. Thereafter, the rim wall support assembly, or assemblies 16, is/are actuated to bear against the annular wall 72, as indicated at block 180. Thereafter, the wheel/rim preform 18 is machined, as shown at block 182, and then removed from the workpiece support, as shown respectively in blocks 182 and 184.

While the invention has been described with particular reference to the drawings, it should be understood that various modifications could be made without departing from the spirit and scope of the present invention.

The invention claimed is:

1. A method of processing a vehicle wheel/rim preform having a first rotational axis and comprising a centersection/spider and an annular wall extending around the centersection/spider and first rotational axis and having an annular surface defining axially spaced, annular inboard and outboard bead seats, the method comprising the steps of:

providing a workpiece support comprising a chuck assembly that is rotatable around a second axis and at least one rim wall support assembly;

engaging the chuck assembly with the centersection/spider to maintain the vehicle wheel/rim preform in a processing position on the chuck assembly wherein the first rotational axis on the vehicle wheel/rim preform is substantially coincident with the second axis;

engaging the at least one rim wall support assembly with the annular wall through a plurality of radially outwardly facing surfaces that each engages a radially inwardly facing surface on the annular wall to thereby exert radial forces upon the annular wall at circumferentially spaced locations to thereby stabilize the wheel/rim preform; and processing the vehicle wheel/rim preform at the annular surface fully axially between the inboard and outboard bead seats with the vehicle wheel/rim preform maintained in the processing position and rotated by the chuck assembly around the second axis.

2. The method of processing a vehicle wheel/rim preform according to claim 1 wherein the vehicle wheel/rim preform has a central axle bore with a surrounding surface and the step of engaging the chuck assembly with the centersection/spider comprises engaging at least one jaw on the chuck assembly at the surrounding surface.

3. The method of processing a vehicle wheel/rim preform according to claim 2 wherein the surrounding surface has a stepped diameter with a smaller diameter pilot bore surface portion, a larger diameter surrogate bore surface portion and an axially facing transition surface portion between the pilot bore surface portion and surrogate bore surface portion, and the step of engaging at least one jaw at the surrounding surface comprises engaging at least one jaw against the pilot bore surface portion so as to thereby bear the vehicle wheel/rim preform in an axial direction.

4. The method of processing a vehicle wheel/rim preform according to claim 3 wherein the workpiece support comprises an axially facing locator surface and the step of engaging at least one jaw at the surrounding surface comprises bearing the vehicle wheel/rim preform against the locator surface.

5. The method of processing a vehicle wheel/rim preform according to claim 4 further comprising the step of providing a controller and a processing assembly and causing the generation of an operating signal and processing of the operating signal by the controller to cause actuation of the processing assembly as an incident of the vehicle wheel/rim preform being borne against the locator surface.

6. The method of processing a vehicle wheel/rim preform according to claim 4 further comprising the steps of providing a control causing the generation of an operating signal and processing of the operating signal by the controller to cause actuation of the at least one rim wall support assembly as an incident of the vehicle wheel/rim preform being borne against the locator surface.

7. The method of processing a vehicle wheel/rim preform according to claim 4 wherein the vehicle wheel/rim preform has first and second datum locations, the step of engaging the chuck assembly with the centershaft/spider comprises engaging the chuck assembly with the centershaft/spider at the first datum location and the step of bearing the vehicle wheel/rim preform against the locator surface comprises bearing the second datum location on the vehicle wheel/rim preform against the locator surface.

8. The method of processing a vehicle wheel/rim preform according to claim 1 wherein the centersection/spider has a plurality of lug holes with surrounding edges spaced from and angularly around the first rotational axis, the workpiece support has a plurality of axially projecting clocking/drive pins, and the step of engaging the chuck assembly with the centersection/spider comprises directing a plurality of the clocking/drive pins, one each into a plurality of the lug holes so that the clocking/drive pins and surrounding edges cooperate to thereby limit relative angular movement between the chuck assembly and centersection/spider relative to the first and second axes with the vehicle wheel/rim preform in the processing position.

9. The method of processing a vehicle wheel/rim preform according to claim 8 wherein the workpiece support comprises an axially facing locator surface, at least a part of the locator surface resides radially inside the plurality of lug holes and the step of bearing the vehicle wheel/rim preform against the locator surface comprises bearing the vehicle wheel/rim preform against the part of the locator surface.

10. The method of processing a vehicle wheel/rim preform according to claim 1 wherein the annular wall has axially spaced ends and the step of engaging the at least one rim wall support assembly with the annular wall comprises engaging the at least one rim wall support assembly with the radially inwardly facing surface adjacent to one of the axially spaced ends.

11. The method of processing a vehicle wheel/rim preform according to claim 10 wherein the steps of engaging the chuck assembly with the centershaft/spider and the at least one rim wall support assembly with the annular wall comprise engaging the chuck assembly with the centershaft/spider and the at least one rim wall support assembly with the annular wall so that no structure resides radially outside of the vehicle wheel/rim preform between the axially spaced ends of the annular wall so that a processing tool can move unobstructedly to effect processing of the annular surface fully between the axially spaced ends of the annular wall with the vehicle wheel/rim preform in the processing position.

12. The method of processing a vehicle wheel/rim preform according to claim 1 wherein the vehicle wheel/rim preform has a first datum location, the step of engaging the chuck assembly with the centershaft/spider comprises engaging the chuck assembly with the centershaft/spider at the first datum location.

13. The method of processing a vehicle wheel/rim preform according to claim 1 wherein the step of engaging the at least one rim wall support assembly with the annular wall comprises engaging a plurality of rim wall support assemblies with the annular wall at angularly spaced locations around the first and second axes.

14. The method of processing a vehicle wheel/rim preform according to claim 13 wherein the step of engaging a plurality of rim wall support assemblies with the annular wall comprises engaging between 5-10 rim wall support assemblies with the annular wall at angularly spaced locations around the first and second axes.

15. The method of processing a vehicle wheel/rim preform according to claim 1 wherein the vehicle wheel/rim has an axially facing cap region and further comprising the step of processing the cap region of the vehicle wheel/rim preform with the vehicle wheel/rim preform maintained in the processing position whereby the annular surface and cap region can both be processed without changing the vehicle wheel/rim preform from the processing position.

16. The method of processing a vehicle wheel/rim preform according to claim 1 wherein the step of engaging the at least one rim wall support assembly with the annular wall comprises extending a plunger with a free end, defining one of the radially outwardly facing surfaces, on the one rim wall support assembly radially outwardly to cause the one of the radially outwardly facing surfaces to bear against the annular wall.

17. The method of processing a vehicle wheel/rim preform according to claim 1 wherein the step of engaging the chuck assembly with the centersection/spider comprises causing a plurality of jaws to exert both axial and radial forces upon the centersection/spider such that the radial forces tend to radially center the vehicle wheel/rim preform by aligning the first axis with the second axis.

18. The method of processing a vehicle wheel/rim preform according to claim 16 wherein the step of engaging the at least one rim wall support assembly with the annular wall comprises extending the plunger on the one rim wall support assembly to against the annular wall with a predetermined force.

19. The method of processing a vehicle wheel/rim preform according to claim 18 further comprising the step of locking the plunger to maintain the predetermined force.

20. The method of processing a vehicle wheel/rim preform according to claim 1 wherein the at least one rim wall support assembly engages the annular wall adjacent to one axial end of the vehicle wheel/rim preform, the chuck assembly includes the at least one rim wall support assembly and rotates as a unit around the second axis and the steps of engaging the chuck assembly with the centershaft/spider and engaging the at least one rim wall support assembly with the annular wall comprise engaging the chuck assembly with the centershaft/spider and engaging the at least one rim wall support assembly with the annular wall so that no part of the chuck assembly extends radially to beyond the annular surface at or axially adjacent to the one axial end of the vehicle wheel/rim preform.

21. The method of processing a vehicle wheel/rim preform according to claim 20 wherein the step of engaging the at least one rim wall support assembly with the annular wall comprises engaging the at least one rim wall support assembly with the annular wall at a discrete location spaced axially from the one axial end of the vehicle wheel/rim preform.

* * * * *